United States Patent
Kamon (10) Patent No.: US 12,555,670 B2
(45) Date of Patent: Feb. 17, 2026

(54) MEDICAL IMAGE PROCESSING APPARATUS AND OPERATION METHOD THEREOF

(71) Applicant: FUJIFILM Corporation, Tokyo (JP)

(72) Inventor: Shumpei Kamon, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 384 days.

(21) Appl. No.: 18/297,432

(22) Filed: Apr. 7, 2023

(65) Prior Publication Data

US 2023/0245758 A1    Aug. 3, 2023

Related U.S. Application Data

(63) Continuation of application No. PCT/JP2021/034377, filed on Sep. 17, 2021.

(30) Foreign Application Priority Data

Oct. 9, 2020  (JP) .................. 2020-171382

(51) Int. Cl.
  *G16H 30/00* (2018.01)
  *G06V 10/25* (2022.01)
  *G06V 10/764* (2022.01)

(52) U.S. Cl.
  CPC ............ *G16H 30/00* (2018.01); *G06V 10/25* (2022.01); *G06V 10/764* (2022.01)

(58) Field of Classification Search
  None
  See application file for complete search history.

(56) References Cited

U.S. PATENT DOCUMENTS

| | | | |
|---|---|---|---|
| 8,014,576 | B2 | 9/2011 | Collins et al. |
| 2010/0182412 | A1 | 7/2010 | Taniguchi et al. |
| 2011/0032259 | A1 | 2/2011 | Kim et al. |
| 2015/0006574 | A1 | 1/2015 | Saalbach et al. |
| 2015/0015612 | A1 | 1/2015 | Kurosaki et al. |
| 2017/0039322 | A1* | 2/2017 | Reicher ............... G06F 16/583 |

(Continued)

FOREIGN PATENT DOCUMENTS

| | | |
|---|---|---|
| CN | 104067277 A | 9/2014 |
| EP | 2478834 A1 | 7/2012 |

(Continued)

OTHER PUBLICATIONS

The extended European search report issued by the European Patent Office on Feb. 16, 2024, which corresponds to European Patent Application No. 21877348.9-1126 and is related to U.S. Appl. No. 18/297,432.

(Continued)

*Primary Examiner* — David Ometz
(74) *Attorney, Agent, or Firm* — Studebaker Brackett PLLC (57) ABSTRACT

An input receiving unit receives a designation input of a user for a medical image displayed on a first display screen of a display. An image selection unit acquires selected images selected from a plurality of medical images based on a designated image category that is a category assigned to a designated image and a non-designated image category that is a category assigned to a non-designated image. The selected images are displayed in a list on a second display screen of the display.

16 Claims, 9 Drawing Sheets

(56) References Cited

U.S. PATENT DOCUMENTS

2018/0075188 A1   3/2018  Reicher
2019/0139218 A1   5/2019  Song et al.

FOREIGN PATENT DOCUMENTS

| JP | 2001-024971 A | 1/2001 |
| JP | 2016-158752 A | 9/2016 |
| KR | 10-2019-0074671 A | 6/2019 |
| KR | 10-2034648 B1 | 10/2019 |
| WO | 2009/008125 A1 | 1/2009 |

OTHER PUBLICATIONS

International Search Report issued in PCT/JP2021/034377; mailed Dec. 14, 2021.
International Preliminary Report On Patentability (Chapter I) and Written Opinion of the International Searching Authority issued in PCT/JP2021/034377; issued Mar. 28, 2023.
Shangwang, L. et al.; "Image classification method based on visual saliency detection"; Journal of Computer Applications; Sep. 10, 2015; pp. 2629-2635; vol. 35, No. 9; DOI: 10.11772/j.issn.1001-9081.2015.09.2629; URL: https://www.joca.cn/EN/10.11772/j.issn.1001-9081.2015.09.2629.
An Office Action; mailed by the China National Intellectual Property Administration of the People's Republic of China on Jul. 24, 2025, which corresponds to Chinese Patent Application 202180069127.7 and is related to U.S. Appl. No. 18/297,432.

\* cited by examiner

EXAMINATION REPORT

EXAMINATION ID [A]   PATIENT NAME [TARO FUJI]   PATIENT ID [123456]

CREATOR [JIRO YAMADA]   CREATION DATE [MON: OO/DAY: OO/YEAR: OO]

OPINION

IT IS IMAGE OF ESOPHAGUS.
ABNORMALITIES CAN BE SEEN IN BACK OF THROAT.
PLEASE CONTINUE TO MONITOR PROGRESS.
NEAR CARDIA IS NORMAL.

ENDOSCOPIC IMAGE

MEDICAL IMAGE PROCESSING APPARATUS AND OPERATION METHOD THEREOF

CROSS-REFERENCE TO RELATED APPLICATIONS

This application is a Continuation of PCT International Application No. PCT/JP2021/034377 filed on 17 Sep. 2021, which claims priority under 35 U.S.C § 119 (a) to Japanese Patent Application No. 2020-171382 filed on 9 Oct. 2020. The above application is hereby expressly incorporated by reference, in its entirety, into the present application.

BACKGROUND OF THE INVENTION

1. Field of the Invention

The present invention relates to a medical image processing apparatus that acquires a report-attached image to be attached to a report, and an operation method thereof.

2. Description of the Related Art

In the medical field, a doctor diagnoses a patient while operating a device during an endoscope or an ultrasound examination. After diagnosis, a doctor such as an endoscopist performs a work of selecting an image to be used for a report from still images acquired in the examination. WO2009/008125A (corresponding to US2010/182412A1) describes that, in a case where an image to be attached to a report is selected from images obtained by a capsule endoscope, a list is displayed as a digest image in order to facilitate selection of the image.

SUMMARY OF THE INVENTION

As described above, the work of selecting an image to be used for a report after an examination is automated by artificial intelligence (AI), and a function of automatically selecting an image suitable for the report is installed in a report creation device, thereby reducing a work burden of a doctor who is a user.

However, in a case where the AI cannot appropriately select an image that the doctor thinks should be included in the report, there is a problem in that it takes time and effort to correct the automatically generated report, which does not lead to a reduction in the work burden. Since the image to be included in the report has a portion that depends on a user's preference such as an image of a specific light source mode, a specific composition, and an optimum image of a user's subjectivity, it is difficult to automatically select them uniformly by AI. Therefore, it has been required to reduce the burden of the report creation work while reflecting the user's preference.

An object of the present invention is to provide a medical image processing apparatus and an operation method thereof that can reduce a burden of a report creation work while reflecting a user's preference for an image to be included in a report.

According to an aspect of the present invention, there is provided a medical image processing apparatus comprising a processor, in which the processor is configured to: acquire a plurality of medical images; classify each of the plurality of medical images into a plurality of categories; display the plurality of medical images in a list on a first display screen of a display; receive a designation input of a user for the medical image displayed on the first display screen; determine a designated image group including designated images that are medical images with the designation input and a non-designated image group including non-designated images that are medical images without the designation input among the plurality of medical images; acquire selected images selected from the plurality of medical images based on a designated image category that is a category assigned to the designated image and a non-designated image category that is a category assigned to the non-designated image; and display the selected images in a list on a second display screen of the display.

It is preferable that the selected image includes a first selected image selected from the non-designated image group based on a relationship between the designated image category and the non-designated image category. It is preferable that the relationship between the designated image category and the non-designated image category is configured such that the designated image category and the non-designated image category are different from each other. It is preferable that the selected image includes a second selected image in which all of the designated images included in the designated image group are selected.

It is preferable that the processor is configured to: determine diagnostic usefulness of the medical image; and acquire the selected image based on the usefulness in addition to the designated image category and the non-designated image category. It is preferable that, on the second display screen, a display mode of an image corresponding to the designated image and a display mode of an image corresponding to the non-designated image among the selected images are different from each other.

It is preferable that, on the first display screen, a display mode of each medical image is different depending on the category, and/or, on the second display screen, a display mode of the selected image is different depending on the category. It is preferable that, on the first display screen, a character or symbol information corresponding to the category is added to and displayed on each medical image, and/or, on the second display screen, a character or symbol information corresponding to the category is added to and displayed on each selected image.

It is preferable that, on the first display screen, specific medical images satisfying a specific condition regarding a category and/or diagnostic usefulness among the plurality of medical images are displayed in a list.

It is preferable that the processor is configured to: update the medical images displayed in the list on the first display screen based on the designated image category assigned to the designated image and the non-designated image category assigned to the non-designated image each time the designation input is performed; and receive the designation input for the updated medical images displayed in the list on the first display screen. It is preferable that the processor is configured to, in a case where the designation input is performed for a specific designated image category, perform the update such that a non-designated image to which the same non-designated image category as the specific designated image category is assigned is deleted from the first display screen, or a display mode is changed.

It is preferable that the processor is configured to display designated image information, which is information about the designated image, on the display, and the designated image information includes at least information representing position information of a part corresponding to the designated image by characters or visually, or information representing the number of the designated images by characters or visually.

It is preferable that the category is information about a part of a subject. It is preferable that the category is information about whether or not the image includes a region of interest. It is preferable that the category is information about whether or not the image includes a treatment tool or about a type of the treatment tool included. It is preferable that the category is information about a spraying state of a coloring agent or a dyeing agent in an image.

According to another aspect of the present invention, there is provided an operation method of a medical image processing apparatus comprising a processor, in which the operation method includes steps, performed by the processor, of: acquiring a plurality of medical images; classifying each of the plurality of medical images into a plurality of categories; a step of displaying the plurality of medical images in a list on a first display screen of a display; receiving a designation input of a user for the medical image displayed on the first display screen; determining a designated image group including designated images that are medical images with the designation input and a non-designated image group including non-designated images that are medical images without the designation input among the plurality of medical images; acquiring selected images selected from the plurality of medical images based on a designated image category that is a category assigned to the designated image and a non-designated image category that is a category assigned to the non-designated image; and displaying the selected images in a list on a second display screen of the display.

According to the aspects of the present invention, it is possible to reduce the burden of the report creation work while reflecting the user's preference for the image to be included in the report.

DESCRIPTION OF THE PREFERRED EMBODIMENTS

First Embodiment

Figure 1:
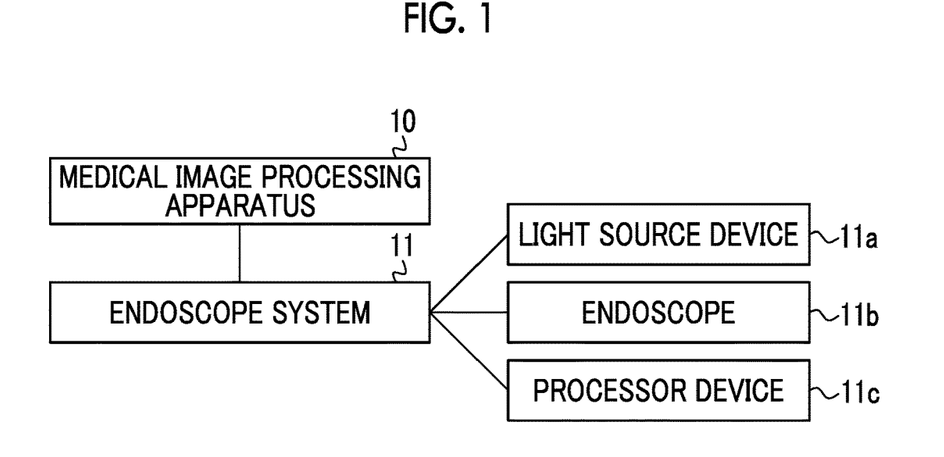
FIG. 1 is a schematic diagram showing a connection relationship between a medical image processing apparatus and an endoscope system.

As shown in FIG. 1, a medical image processing apparatus 10 is connected to an endoscope system 11. The endoscope system 11 acquires a large amount of medical images 12 by using a light source device 11a, an endoscope 11b, and a processor device 11c. The light source device 11a supplies the endoscope 11b with illumination light for illuminating the inside of the body. The endoscope 11b acquires an endoscopic image of the inside of the body by irradiating the inside of the body with illumination light and receiving and imaging reflected light from the inside of the body. The processor device 11c performs image processing on the endoscopic image from the endoscope 11b and displays the endoscopic image on a display for an endoscope (not shown). The endoscope system 11 is connected to the medical image processing apparatus 10, and transmits the acquired endoscopic images as the medical images 12 to the medical image processing apparatus 10.

Figure 2:
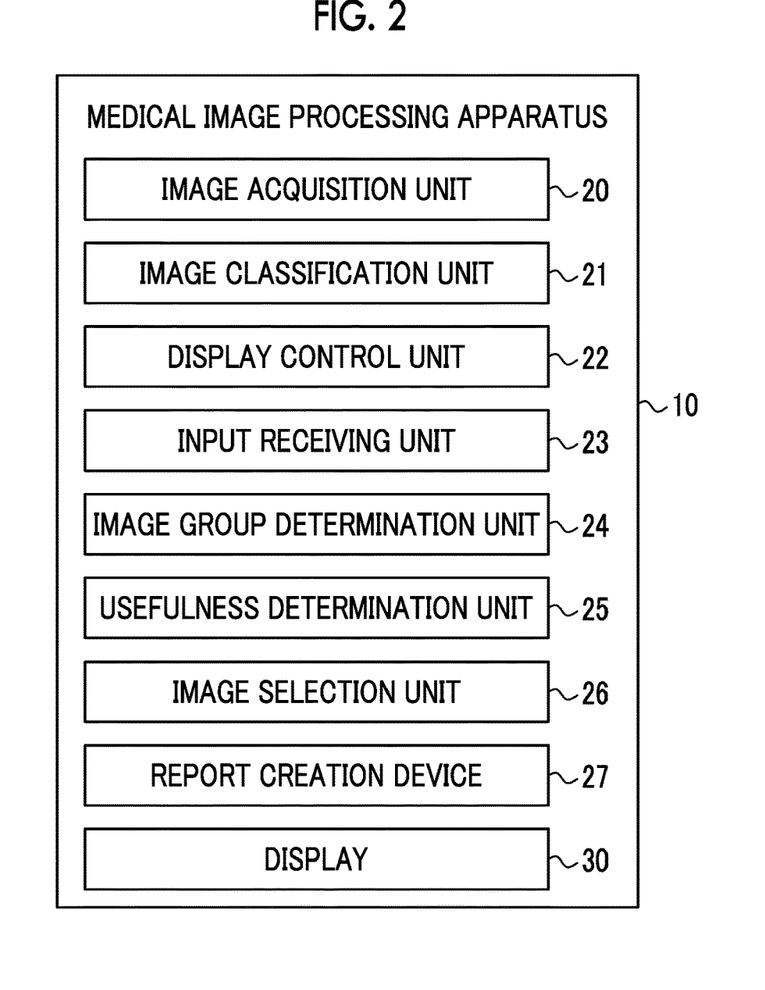
FIG. 2 is a block diagram showing a function of the medical image processing apparatus.

In the medical image processing apparatus 10, programs related to various types of processing are incorporated in a program memory (not shown). The medical image processing apparatus 10 is provided with a central control unit (not shown) configured by a processor. By executing the program in the program memory by the central control unit, as shown in FIG. 2, functions of an image acquisition unit 20, an image classification unit 21, a display control unit 22, an input receiving unit 23, an image group determination unit 24, a usefulness determination unit 25, an image selection unit 26, and a report creation device 27 are implemented. Further, the medical image processing apparatus 10 is provided with a display 30 for displaying various images.

The medical image processing apparatus 10 performs a process of selecting a report-attached image, which is a medical image to be attached to a report created by the report creation device 27, from the medical images obtained by the endoscope system 11.

The image acquisition unit 20 acquires a plurality of medical images 12 from an endoscope system 11 and transmits the plurality of medical images 12 to the image classification unit 21. The image classification unit 21 extracts image information of the medical images 12 transmitted from the image acquisition unit 20 to acquire category information and calculate image quality information. The medical images 12 are classified into each category according to the acquired category information.

The category to be classified is any one or a combination thereof, such as an imaging part, the presence or absence or type of a lesion which is one of the regions of interest, a usage state of a treatment tool, and a spraying state of a coloring agent. In the image quality information, information such as brightness, noise, and a degree of blurring of the image is acquired and attached to the medical image 12. The image information is extracted using a trained convolutional neural network (CNN) model. The trained CNN model is obtained by training using an image group including at least a plurality of medical images 12. It is preferable that the category information and the image quality information acquired at the time of imaging by the endoscope system 11 and attached to the medical image 12 have priority over the information extracted by the trained CNN model.

Figure 3:
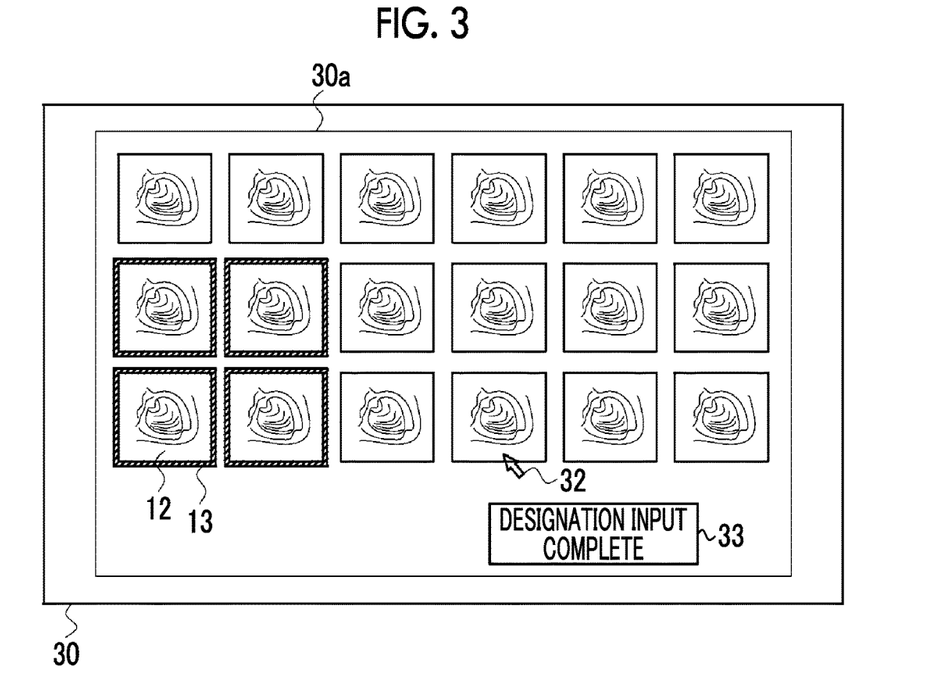
FIG. 3 is an image diagram showing medical images displayed in a list on a first display screen.

As shown in FIG. 3, the display control unit 22 displays the plurality of medical images 12 in a list on a first display screen 30a of the display 30. By displaying the plurality of medical images 12 in a list in this way, the user can select the medical images 12. It is preferable that the medical images 12 displayed in a list on the first display screen 30a are categorized medical images 12 that have been classified into a plurality of categories by the image classification unit 21, or uncategorized medical images 12 that have not been classified into a plurality of categories by the image classification unit 21.

The input receiving unit 23 receives at least a designation input of the user for the medical image 12 displayed on the display 30. Specifically, as shown in FIG. 3, a cursor 32 that reflects a user operation such as a mouse operation is displayed on the display 30, and the user uses the cursor 32 to perform a designation input for the medical image 12. The designation input can be performed not only for one medical image but also for a plurality of images. The input receiving unit 23 receives a designation input designated by the cursor 32. After the designation input for the medical image is completed, a designation input completion icon 33 is operated using the cursor 32. Further, it is preferable that the medical image 12 with a designation input is displayed by adding a thick frame 13 to the outer edge or by adding a mark indicating the designation input thereto.

Figure 4:
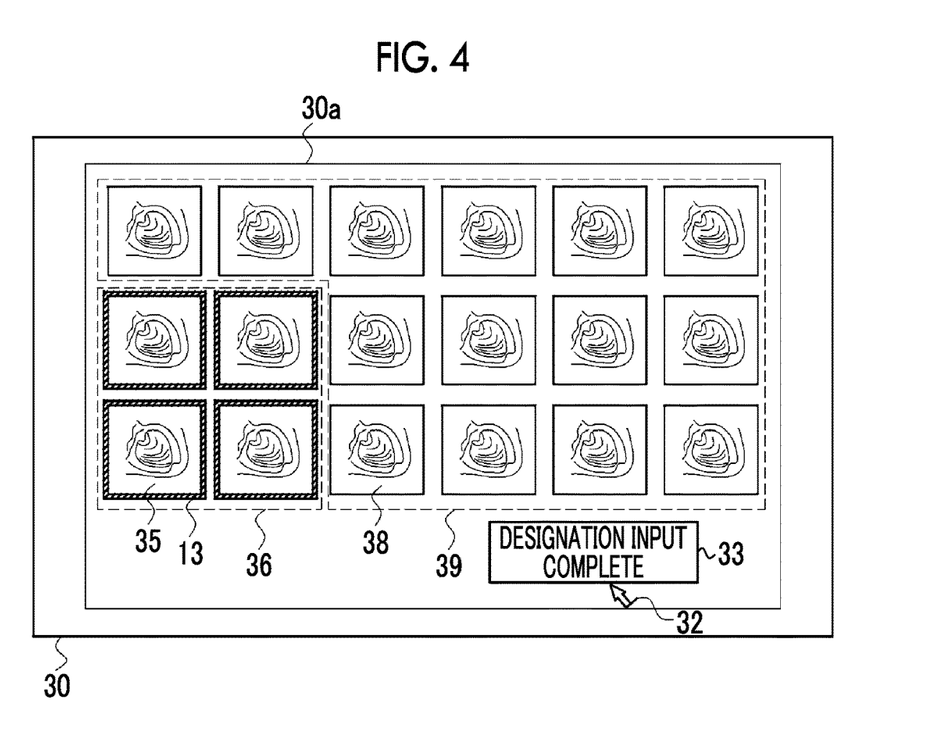
FIG. 4 is an image diagram showing a designated image and a non-designated image at the time of completion of a designation input.

The image group determination unit 24 determines a designated image group including designated images that are medical images with a designation input and a non-designated image group including non-designated images that are medical images without a designation input among a plurality of medical images acquired by the image acquisition unit 20. Specifically, as shown in FIG. 4, the medical images 12 that have been designated and input at the time of completion of the designation input in which the input receiving unit 23 receives the instruction to complete the designation input are set as designated images 35, and a designated image group 36 including these designated images 35 is determined. In addition, the medical images 12 that have not been designated and input at the time of completion of the designation input are set as non-designated images 38, and a non-designated image group 39 including these non-designated images is determined.

The usefulness determination unit 25 determines the diagnostic usefulness of the medical image 12 based on the classification result and the image quality information obtained by the image classification unit 21. The higher the diagnostic usefulness, the higher the likelihood that the image is suitable as a report-attached image. The evaluation of usefulness is represented by, for example, a graded evaluation. It can be evaluated that the medical image 12 having an item such as a lesion in the classification result of the category and having a low degree of blurring in the image quality evaluation is highly useful. In a case where there is no category information, the degree of blurring is large, the lightness is too high, or the lightness is too low, the usefulness is low. The medical image 12 for which the determination of usefulness has been completed is transmitted to the image selection unit 26. The usefulness is evaluated, and the evaluation threshold value can be freely set by the user. In addition to the medical image 12, the determination of usefulness may be performed on the designated image 35 or the non-designated image.

The image selection unit 26 acquires selected images selected from the plurality of medical images 12 based on a designated image category that is a category assigned to the designated image 35 and a non-designated image category that is a category assigned to the non-designated image 38. More preferably, the image selection unit 26 may acquire the selected images based on the usefulness obtained by the usefulness determination unit 25 in addition to the designated image category and the non-designated image category. It is preferable that the number of selected images is set such that the sum of the number of designated images and the number of selected images is a specific number. Further, the number of selected images may be set to the number designated by a doctor. It is preferable that the setting of the number of images is received by the input receiving unit 23.

Figure 5:
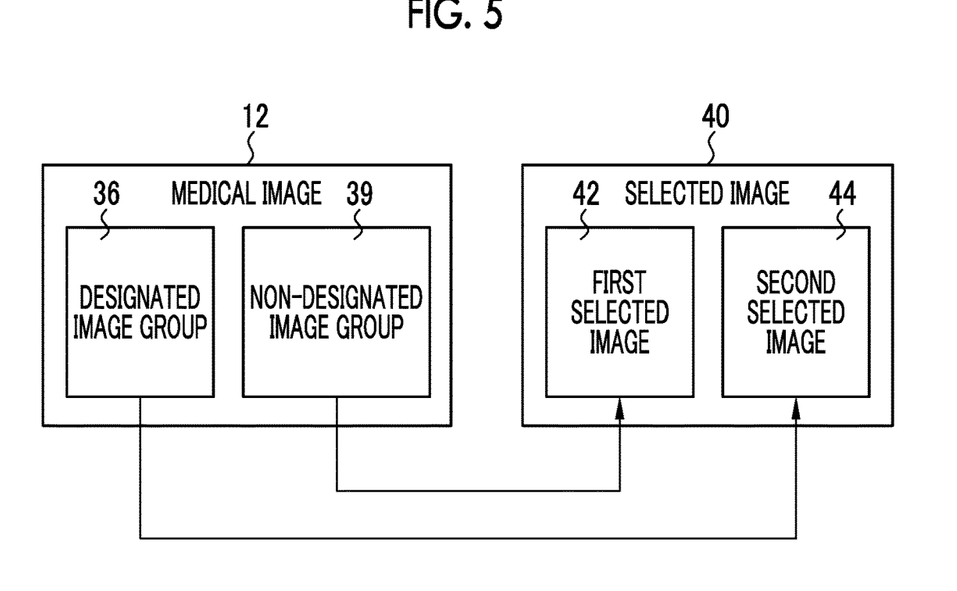
FIG. 5 is an explanatory diagram regarding acquisition of a selected image.

Specifically, as shown in FIG. 5, it is preferable that selected images 40 acquired by the image selection unit 26 include a first selected image 42 selected from the non-designated image group 39 based on the relationship between the designated image category and the non-designated image category. It is preferable that the relationship between the designated image category and the non-designated image category is configured such that the designated image category and the non-designated image category are different from each other. In this case, examples of the first selected image 42 include "a non-designated image 38 of an imaging part different from the designated image 35", "a non-designated image 38 including no lesion in a case where the designated image 35 includes a lesion", "a non-designated image 38 in which the treatment tool is not used in a case where the designated image 35 is using the treatment tool", "a non-designated image 38 in which a coloring agent is not sprayed in a case where the designated image 35 is spraying a coloring agent", and the like. On the other hand, it is preferable that the selected images 40 include a second selected image 44 in which all of the designated images 35 included in the designated image group 36 are selected.

Figure 6:
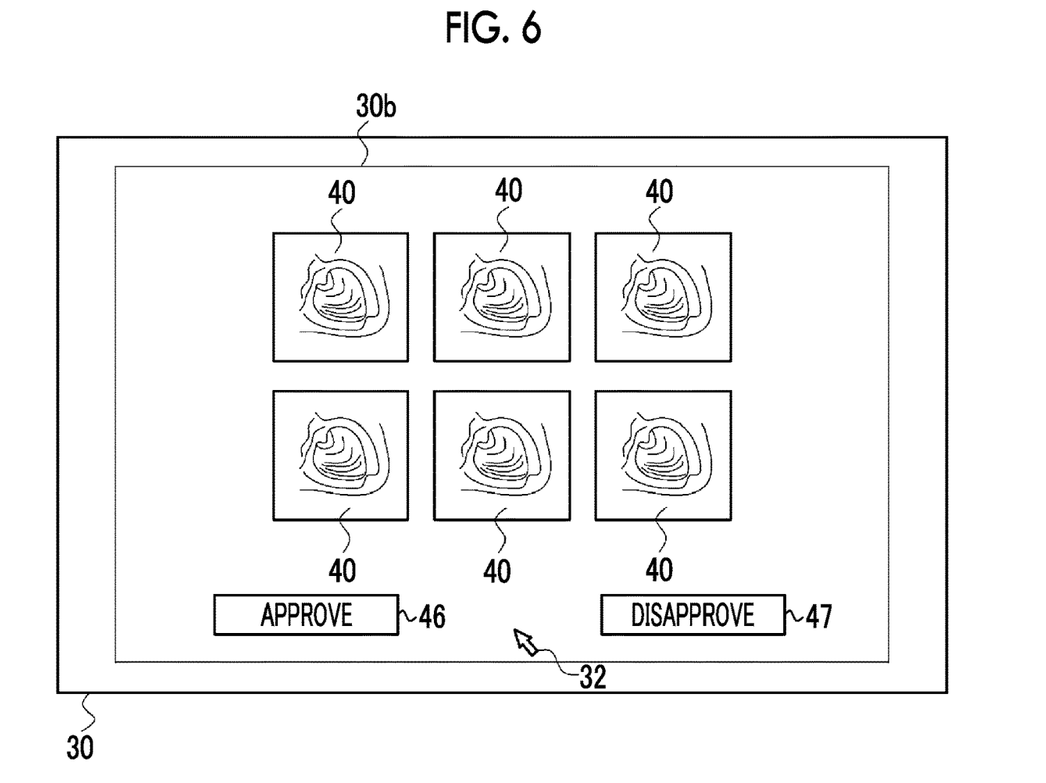
FIG. 6 is an image diagram showing selected images displayed in a list on a second display screen.

As shown in FIG. 6, the display control unit 22 displays the selected images 40 on a second display screen 30b of the display 30. In a case where the user checks the selected images 40 and determines that the selected images 40 are suitable as report-attached images to be used in the report creation device 27, the user operates an approval icon 46 displayed on the display 30 using the cursor 32. In a case where the approval icon 46 is operated, the selected images 40 are transmitted to the report creation device 27 as report-attached images. On the other hand, in a case where the selected images 40 are not approved as the report-attached images, a disapproval icon 47 is operated. In this case, the display 30 switches to the first display screen 30a and switches to a state of receiving the designation input of the user.

As described above, before automatically selecting the report-attached image, the user selects the second selected image 44, then automatically selects the first selected image 42, and sets the selected image 40 including the first selected image 42 and the second selected image 44 as the report-attached image to be used in the report creation device 27, thereby reducing the burden of the report creation work while reflecting the preference of the doctor who is the user.

Figure 7:
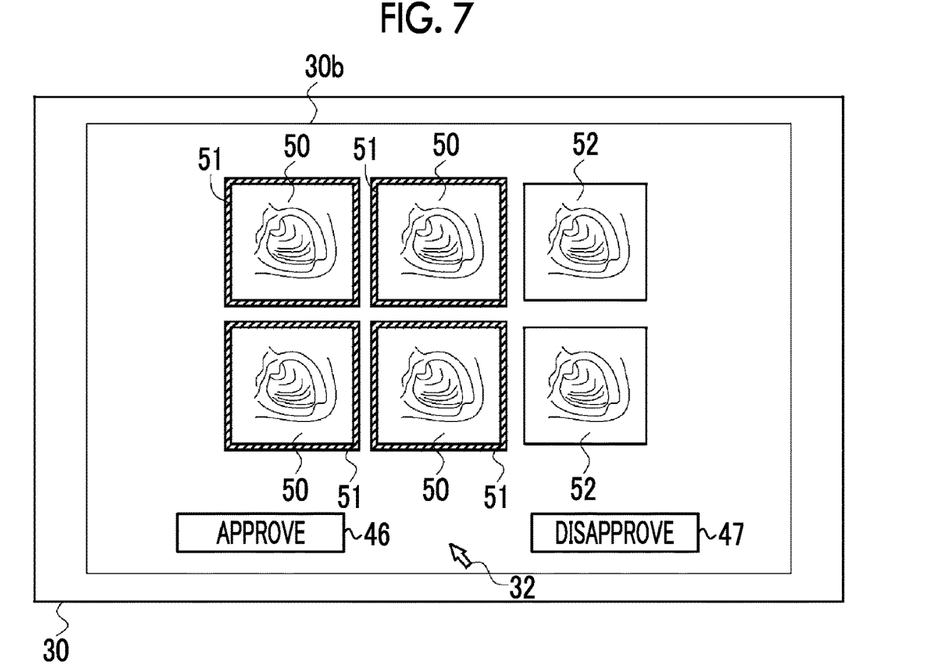
FIG. 7 is an image diagram showing that a display mode is different between an image corresponding to a designated image and an image corresponding to a non-designated image among the selected images.

It is preferable that, on the second display screen 30b, the display mode of the image corresponding to the designated image 35 and the display mode of the image corresponding to the non-designated image 38 among the selected images 40 are different from each other. For example, as shown in FIG. 7, there is a form in which a thick frame 51 is displayed on the outer edge of an image 50 corresponding to the designated image 35, while the thick frame 51 is not displayed on an image 52 corresponding to the non-designated image 38.

Figure 8:
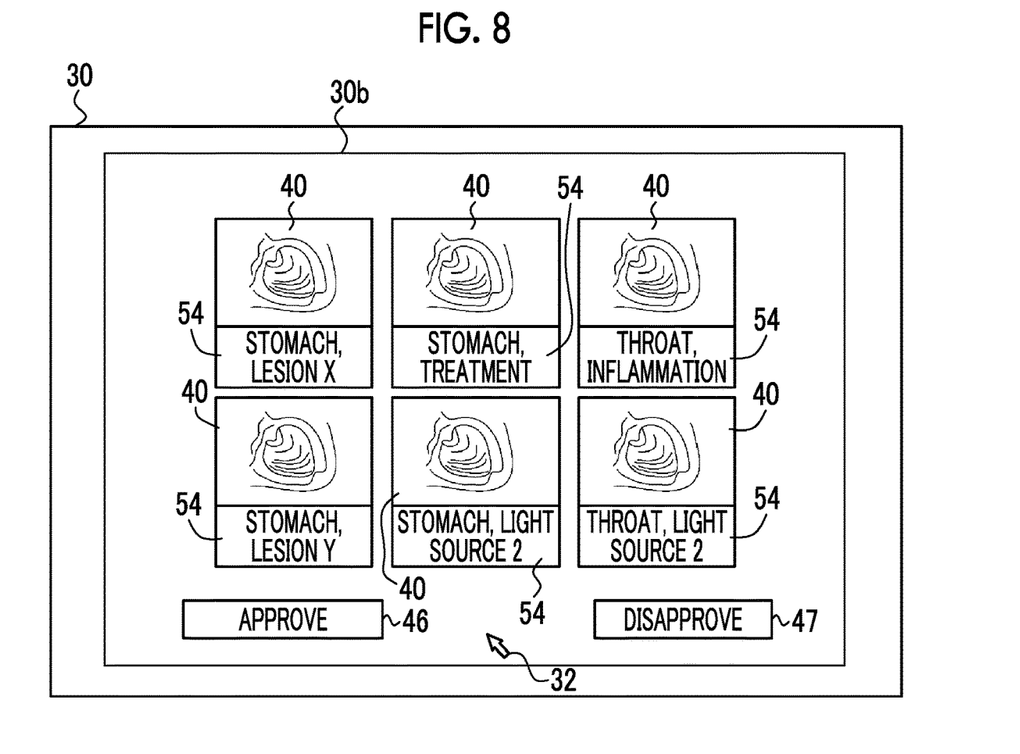
FIG. 8 is an image diagram showing characters related to a category assigned to each selected image.

In addition, it is preferable that, on the category on the first display screen 30a, the display mode of each medical image 12 is different depending, and it is preferable that, on the second display screen 30b, the display mode of each selected image 40 is different depending on the category. For example, as shown in FIG. 8, on the second display screen 30b, characters 54 corresponding to the categories are added to each selected image 40. The characters corresponding to the category include a part name, a lesion name, a light source used, and a presence or absence of treatment with a treatment tool. In addition, symbol information corresponding to the category may be added to and displayed on each selected image 40. The symbol information corresponding to the category includes information in which a part name, a lesion name, a light source used, a presence or absence of treatment with a treatment tool, and the like are symbolized. For example, in a case where an upper endoscope is used, it is conceivable that the esophagus, stomach, and duodenum are designated as "area1", "area2", and "area3" in the order of insertion. In addition, it is preferable that, on the first display screen 30a as well, a character or symbol information corresponding to the category is added to and displayed on each medical image 12 through the same method as the second display screen 30b.

In addition, as described above, the display mode of the medical image 12 or the selected image 40 corresponding to the category may be a mode in which characters or symbols are not used. For example, on the first display screen 30a or the second display screen 30b, the display position of the medical image 12 or the selected image 40 may be changed according to the category. For example, in a case where the medical image or the selected image 40 is displayed in the row direction (vertical direction), it is preferable to display the medical image 12 or the selected image 40 of different categories in units of one or a plurality of rows. Accordingly, on the first display screen 30a, the user can easily select (designate and input) the medical image 12, and on the second display screen 30b, it is easy to grasp the category of the image group to be included in the report.

Figure 9:
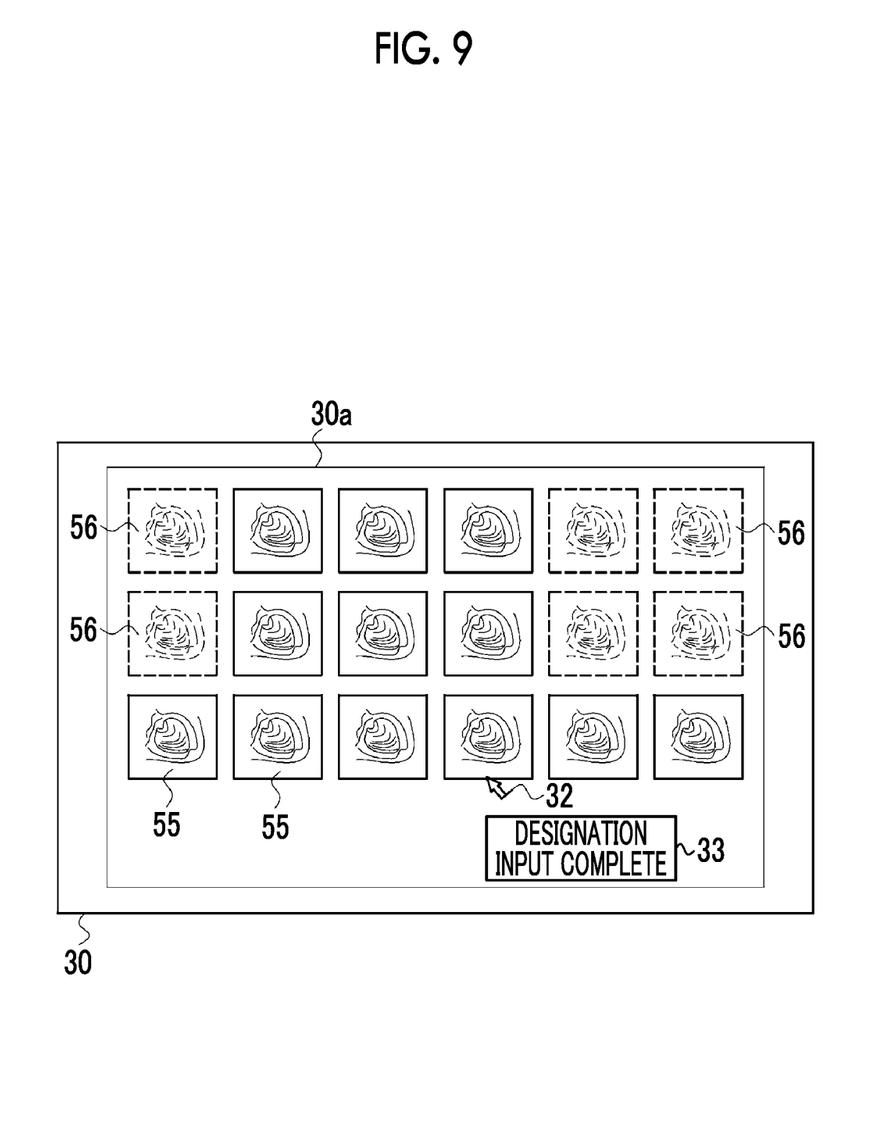
FIG. 9 is an image diagram showing specific medical images displayed in a list on the first display screen.

Note that, as shown in FIG. 9, it is preferable that, on the first display screen 30a, specific medical images 55 satisfying a specific condition regarding a category and/or diagnostic usefulness among the plurality of medical images 12 are displayed in a list. The input receiving unit 23 receives the designation input of the user for the specific medical images 55 displayed in the list on the first display screen 30a. As described above, by displaying only the specific medical images 55 in a list instead of displaying all the medical images, it is possible to reduce the burden of the user due to the designation input. It is preferable that the specific condition includes at least one of the number of images included in the same category being a specific number or less, or the image being an image having high diagnostic usefulness. Medical images 56 other than the specific medical images 55 are excluded from the target of the designation input. In this case, as a display mode of the medical image 56 other than the specific medical image 55, preferably, the medical image 56 is either left displayed on a first display screen 50a (for example, grayed out) although the visibility is lower than that of the specific medical image 55 or completely excluded from the medical image 56 on the first display screen 50a (hidden).

Figure 10:
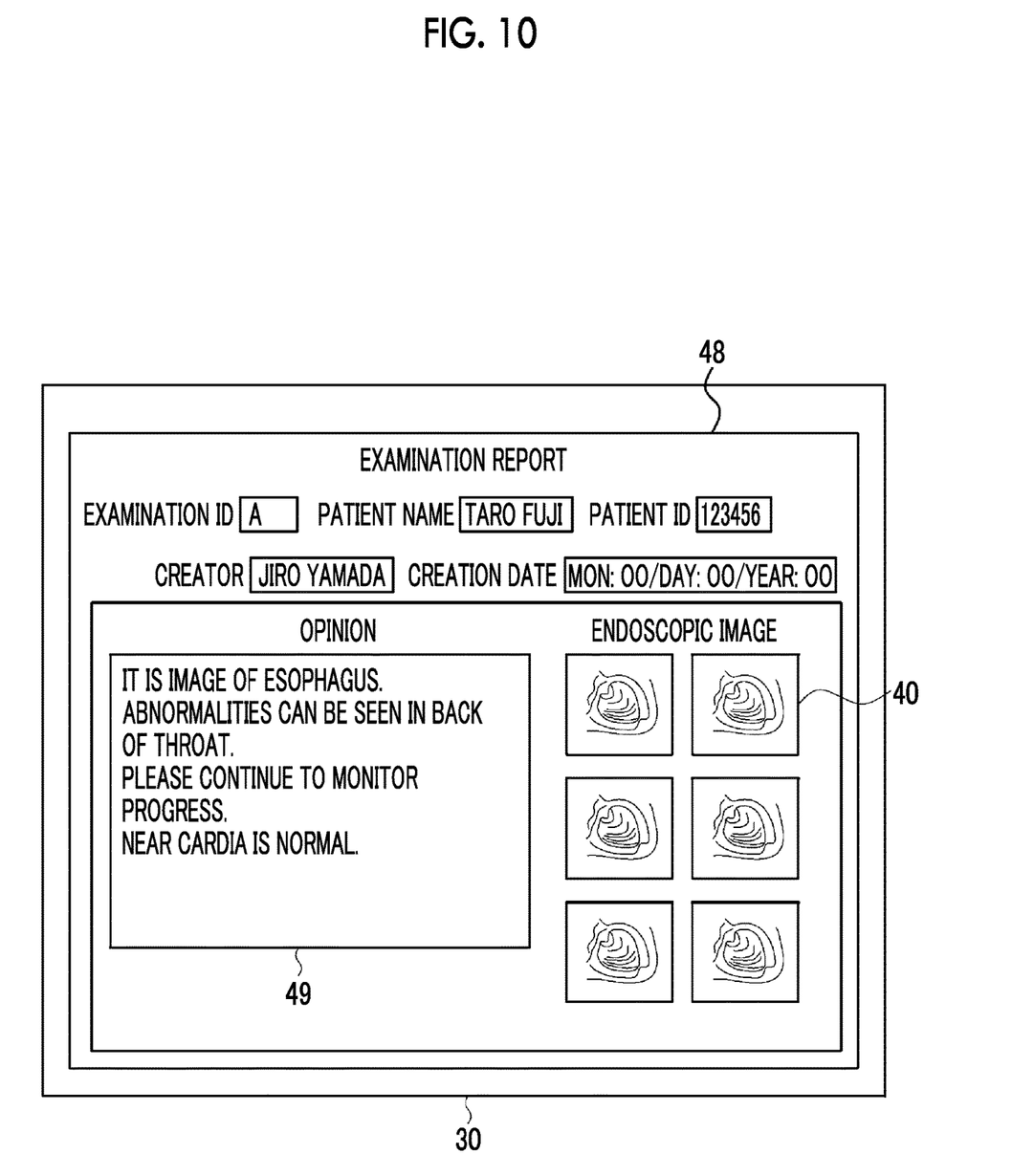
FIG. 10 is an image diagram showing a report creation screen.

As shown in FIG. 10, the report creation device 27 creates a report using a report creation screen 48 displayed on the display 30. In addition to the selected image 40 being automatically attached to the report creation screen 48, patient information, user information, and the like that have been input in advance are automatically input thereto. The user inputs an opinion in an opinion input field 49 and creates a report.

Figure 11:
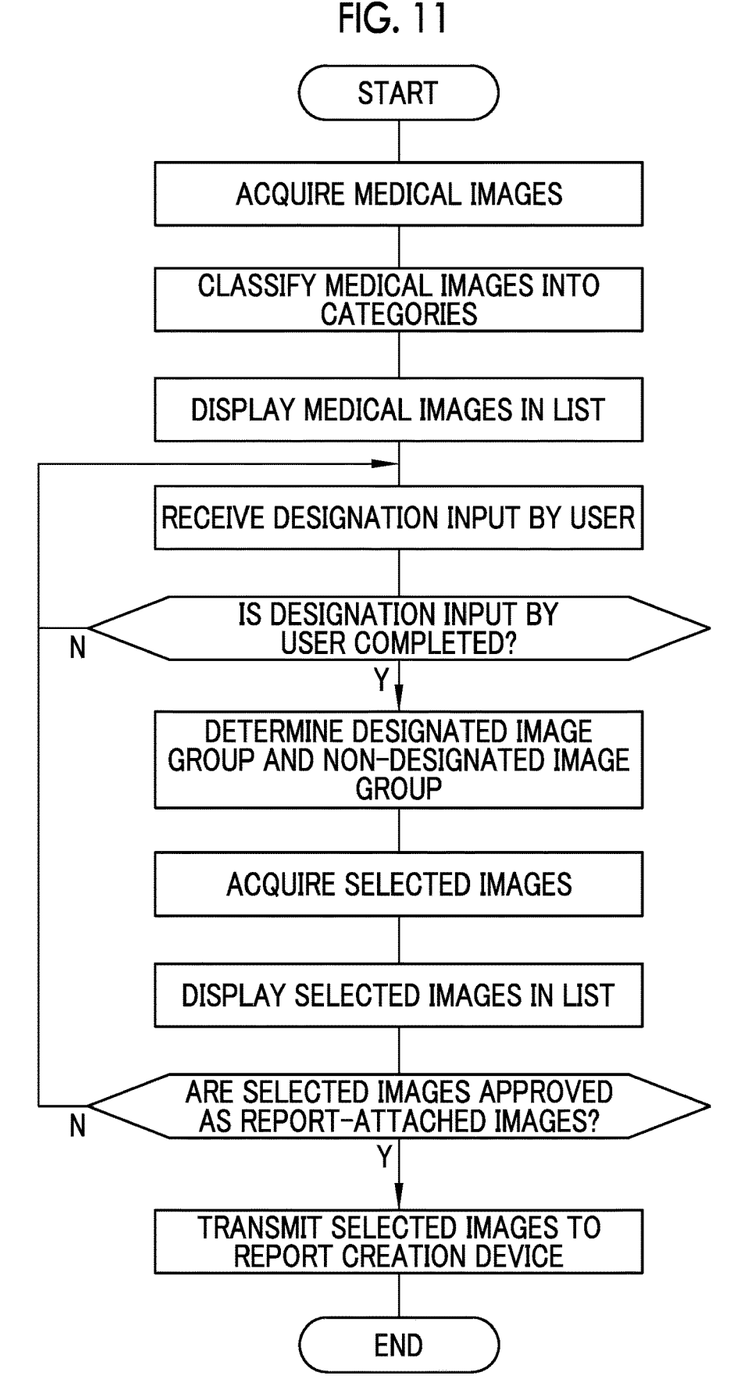
FIG. 11 is a flowchart showing a series of flows for selecting a report-attached image.

Next, a series of flows of the process of selecting the report-attached image will be described with reference to the flowchart of FIG. 11. The image acquisition unit 20 acquires a plurality of medical images 12 from an endoscope system 11. The image classification unit 21 classifies the respective medical image 12 into a plurality of categories. The display control unit 22 displays the plurality of medical images in a list on the first display screen 30a of the display 30. The input receiving unit 23 receives the designation input of the user for the medical image displayed on the first display screen 30a. In a case where the designation input by the user is completed, the designation input completion icon 33 is operated.

In a case where the designation input completion icon 33 is operated, the image group determination unit 24 determines a designated image group 36 including designated images 35 that are medical images 12 with a designation input and a non-designated image group 39 including non-designated images 38 that are medical images 12 without a designation input among a plurality of medical images 12. The image selection unit 26 acquires the selected images 40 selected from the plurality of medical images 12 based on a designated image category that is a category assigned to the designated image 35 and a non-designated image category that is a category assigned to the non-designated image 38. The display control unit 22 displays the selected images 40 in a list on the second display screen 30b of the display 30.

In a case where the user approves the selected images 40 displayed in the list as the report-attached images, the approval icon 46 is operated. In a case where the approval icon 46 is operated, the selected images 40 are transmitted to the report creation device 27 as report-attached images. On the other hand, in a case where the selected images 40 are not approved as the report-attached images, a disapproval icon 47 is operated. In this case, the display 30 switches to the first display screen 30a and switches to a state of receiving the designation input of the user.

Second Embodiment

In a second embodiment, the medical images displayed in a list on the first display screen 30a are updated each time the designation input by the user is performed. Specifically, the display control unit 22 updates the medical images displayed in a list on the first display screen 30a based on the designated image category and the non-designated image category each time the designation input is performed. The input receiving unit 23 receives the designation input of the user for the updated medical images displayed in the list on the first display screen 30a.

Figure 12:
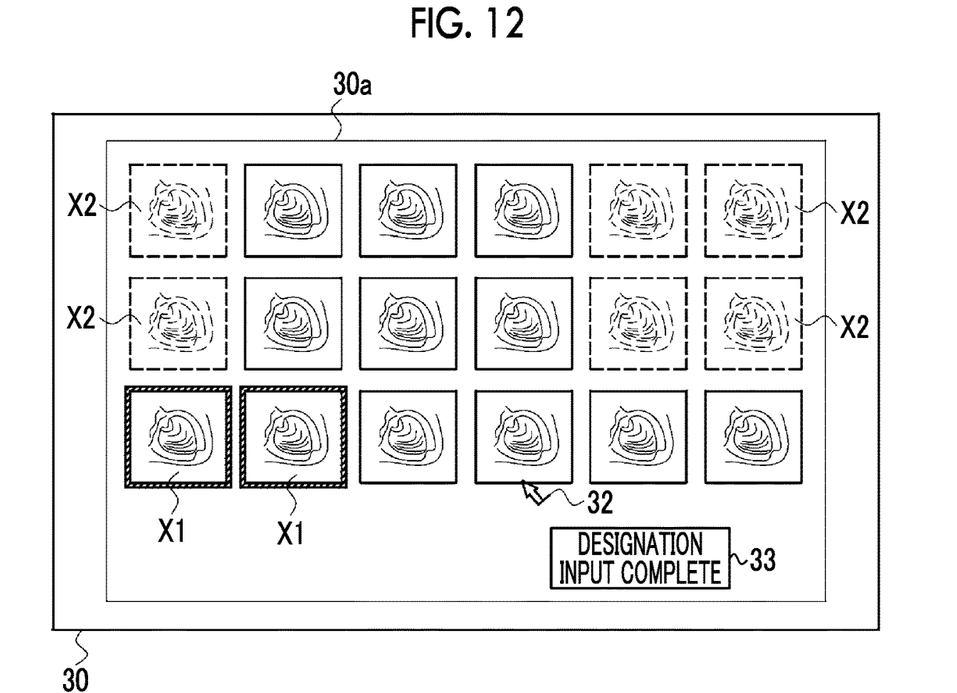
FIG. 12 is an image diagram showing specific medical images displayed in a list on the first display screen.

For example, as shown in FIG. 12, in a case where a designation input is performed to a designated image X1 to which a specific designated image category X is assigned, the display control unit 22 performs the update such that a non-designated image X2 to which the same non-designated image category X as the specific designated image category X is assigned is deleted from the first display screen 30a (is hidden on the first display screen 30a). Thereby, the number of images to be checked by the user is reduced, so that the work burden of the user can be reduced. Here, preferably, examples of the image to be deleted from the first display screen 30a in response to the designation input by the user include, for example, "the non-designated image X2 in which the imaging part is the same as the designated image X1", "the non-designated image X2 in which the imaging part is close to the designated image X1", and "the non-designated image X2 during treatment or during coloring agent spraying in a case where the designated image X1 is an image during treatment with a treatment tool or an image during coloring agent spraying". The non-designated image X2 may be hidden on the first display screen 30a, or may be left displayed on the first display screen 30a (for example, grayed out) although the visibility is lower than that of the designated image X1.

Third Embodiment

Figure 13:
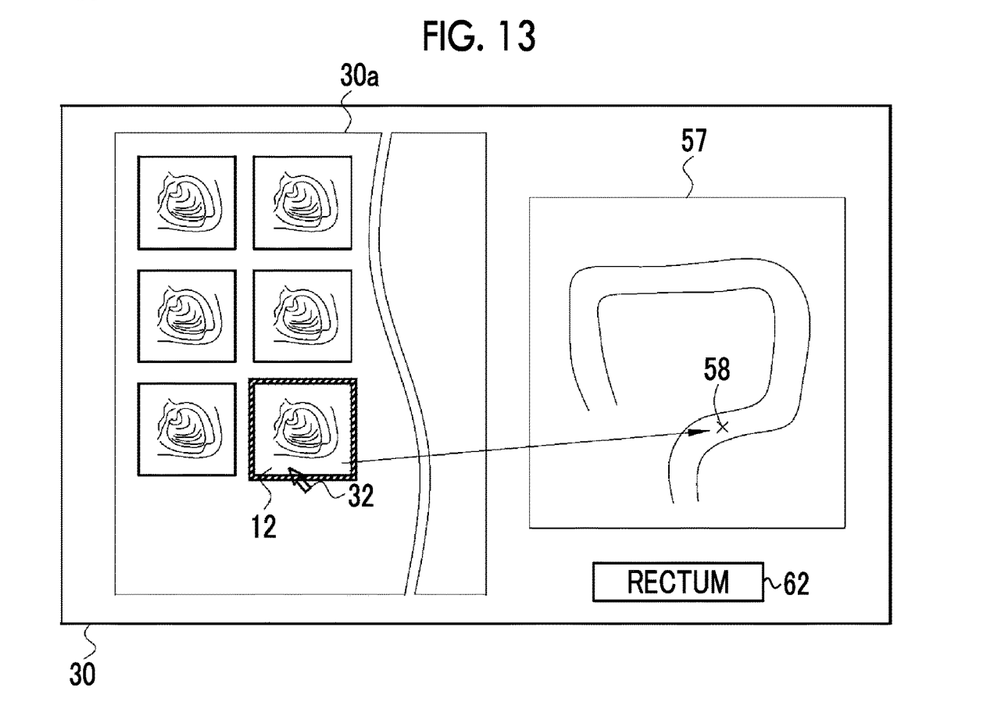
FIG. 13 is an image diagram showing position information of characters related to a designated image and a part corresponding to the designated image in a schematic diagram.

In a third embodiment, in order to make it easier for the user to understand the work status in a case where the designation input is performed, the display control unit 22 displays designated image information about the designated image on the display 30. As the designated image information, for example, it is preferable that the designated image information is information representing position information of a part corresponding to the designated image by characters or visually. In a case where the part corresponding to the designated image is the rectum which is a predetermined position of the large intestine, as shown in FIG. 13, it is preferable to display "rectum" on the display 30 as position information 62 of the characters, or to display, on the display 30, a point 58 indicating that the designation input has been made in a portion corresponding to "rectum" in a schematic diagram 57 of the large intestine.

Figure 14:
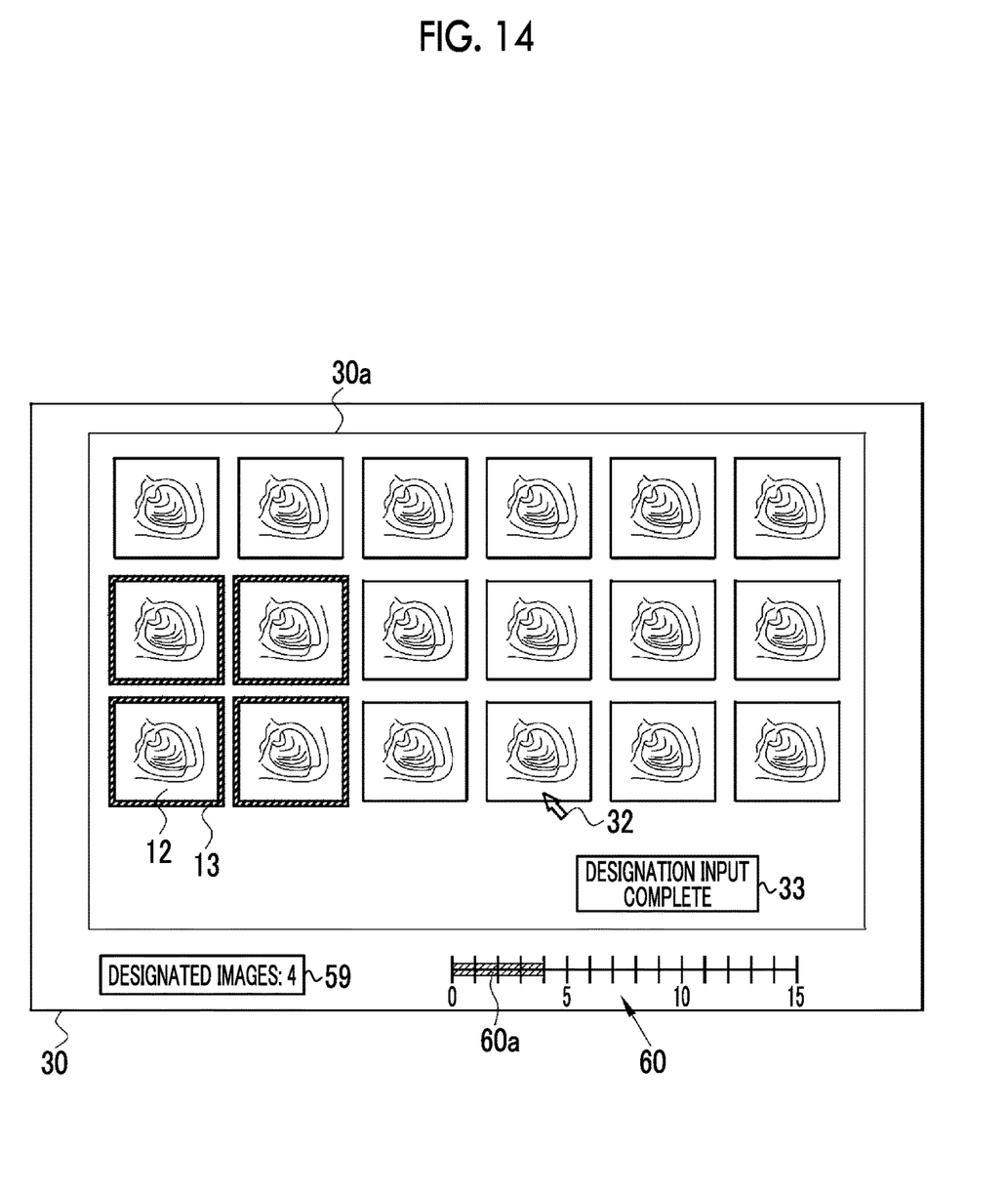
FIG. 14 is an image diagram showing the number of designated images with characters and a number counting bar.

In addition, as the designated image information, for example, it is preferable that the designated image information is information representing the number of designated images 35 by characters or visually. In a case where the number of designated images 35 at the time of performing the designation input is four, as shown in FIG. 14, it is preferable to display "4" as character information 59 on the display 30, or to display, on the display 30, a length 60a corresponding to "4" in a number counting bar 60 representing the number of designated images 35.

In the above embodiments, hardware structures of processing units for executing various kinds of processing, such as the image acquisition unit 20, the image classification unit 21, the display control unit 22, the input receiving unit 23, the image group determination unit 24, the usefulness determination unit 25, the image selection unit 26, and the report creation device 27, are various processors shown below. The various processors include a central processing unit (CPU) as a general-purpose processor functioning as various processing units by executing software (program), a programmable logic device (PLD) as a processor of which the circuit configuration can be changed after manufacturing such as a graphical processing unit (GPU) or a field programmable gate array (FPGA), a dedicated electrical circuit as a processor having a circuit configuration designed exclusively for executing various kinds of processing, and the like.

One processing unit may be configured by one of various processors, or may be configured by a combination of the same or different kinds of two or more processors (for example, a combination of a plurality of FPGAs, a combination of a CPU and an FPGA, a combination of a CPU and a GPU, or the like). In addition, a plurality of processing units may be configured by one processor. As an example of configuring a plurality of processing units via one processor, first, as represented by a computer, such as a client or a server, there is a form in which one processor is configured by a combination of one or more CPUs and software, and this processor functions as a plurality of processing units. Second, as represented by a system on chip (SoC) or the like, there is a form of using a processor for realizing the function of the entire system including a plurality of processing units with one integrated circuit (IC) chip. Thus, various processing units are configured by using one or more of the above-described various processors as hardware structures.

More specifically, the hardware structure of these various processors is an electrical circuit (circuitry) in the form of a combination of circuit elements, such as semiconductor elements. The hardware structure of the storage unit is a storage device such as a hard disc drive (HDD) or a solid state drive (SSD).

EXPLANATION OF REFERENCES

10: medical image processing apparatus
11: endoscope system
11a: light source device
11b: endoscope
11c: processor device
12: medical image
13: thick frame
20: image acquisition unit
21: image classification unit
22: display control unit
23: input receiving unit
24: image group determination unit
25: usefulness determination unit
26: image selection unit
27: report creation device
30: display
30a: first display screen
30b: second display screen
32: cursor
33: designation input completion icon
35: designated image
36: designated image group
38: non-designated image
39: non-designated image group
40: selected image
42: first selected image
44: second selected image
46: approval icon
47: disapproval icon
48: report creation screen
49: opinion input field
50, 52: image
51: thick frame
54: character
55: specific medical image
56: image other than specific medical image
57: schematic diagram of large intestine
58: point
59: character information
60: number counting bar
62: position information of character
X1: designated image
X2: non-designated image

What is claimed is:

1. A medical image processing apparatus comprising a processor,
wherein the processor is configured to:
acquire a plurality of medical images;
extract image information from the plurality of medical images using a convolutional neural network;
classify each of the plurality of medical images into a plurality of categories based on the image information;
display the plurality of medical images in a list on a first display screen of a display;
receive a designation input of a user for the plurality of medical images displayed on the first display screen;
determine a designated image group including designated images that are medical images with the designation input and a non-designated image group including non-designated images that are medical images without the designation input among the plurality of medical images;
judge diagnostic usefulness of each of the plurality of medical images based on the image information;
acquire selected images selected from the plurality of medical images based on a designated image category that is a category assigned to the designated images, a non-designated image category that is a category assigned to the non-designated images, and the diagnostic usefulness; and
display the selected images in a list on a second display screen of the display.

2. The medical image processing apparatus according to claim 1,
wherein the selected images include a first selected image selected from the non-designated image group based on a relationship between the designated image category and the non-designated image category.

3. The medical image processing apparatus according to claim 2,
wherein the relationship between the designated image category and the non-designated image category is configured such that the designated image category and the non-designated image category are different from each other.

4. The medical image processing apparatus according to claim 1,
wherein the selected images include a second selected image in which all of the designated images included in the designated image group are selected.

5. The medical image processing apparatus according to claim 1,
wherein, on the second display screen, a display mode of an image corresponding to the designated image and a display mode of an image corresponding to the non-designated image among the selected images are different from each other.

6. The medical image processing apparatus according to claim 1,
wherein, at least one of:
on the first display screen, a display mode of each medical image is different depending on the category, or
on the second display screen, a display mode of the selected images is different depending on the category.

7. The medical image processing apparatus according to claim 6,
wherein, at least one of:
on the first display screen, a character or symbol information corresponding to the category is added to and displayed on each medical image, or
on the second display screen, a character or symbol information corresponding to the category is added to and displayed on each selected image.

8. The medical image processing apparatus according to claim 1,
wherein, on the first display screen, specific medical images satisfying a specific condition regarding at least one of a category or diagnostic usefulness among the plurality of medical images are displayed in a list.

9. The medical image processing apparatus according to claim 1,
wherein the processor is configured to:
update the medical images displayed in the list on the first display screen based on the designated image category assigned to the designated images and the non-designated image category assigned to the non-designated images each time the designation input is performed; and
receive the designation input for the updated medical images displayed in the list on the first display screen.

10. The medical image processing apparatus according to claim 9,
wherein the processor is configured to, in a case where the designation input is performed for a specific designated image category, perform the update such that a non-designated image to which the same non-designated image category as the specific designated image category is assigned is deleted from the first display screen, or a display mode is changed.

11. The medical image processing apparatus according to claim 1,
wherein the processor is configured to display designated image information, which is information about the designated image, on the display, and
the designated image information includes at least information representing position information of a part corresponding to the designated image by characters or visually, or information representing the number of the designated images by characters or visually.

12. The medical image processing apparatus according to claim 1,
wherein the category is information about a part of a subject.

13. The medical image processing apparatus according to claim 1,
wherein the category is information about whether or not the image includes a region of interest.

14. The medical image processing apparatus according to claim 1,
wherein the category is information about whether or not the image includes a treatment tool or about a type of the treatment tool included.

15. The medical image processing apparatus according to claim 1,
wherein the category is information about a spraying state of a coloring agent or a dyeing agent in an image.

16. An operation method of a medical image processing apparatus comprising a processor, the operation method comprising steps, performed by the processor, of:
acquiring a plurality of medical images;
extracting image information from the plurality of medical images using a convolutional neural network;

classifying each of the plurality of medical images into a plurality of categories based on the image information;
displaying the plurality of medical images in a list on a first display screen of a display;
receiving a designation input of a user for the plurality of medical images displayed on the first display screen;
determining a designated image group including designated images that are medical images with the designation input and a non-designated image group including non-designated images that are medical images without the designation input among the plurality of medical images;
judging diagnostic usefulness of each of the plurality of medical images based on the image information;
acquiring selected images selected from the plurality of medical images based on a designated image category that is a category assigned to the designated images, a non-designated image category that is a category assigned to the non-designated images, and the diagnostic usefulness; and
displaying the selected images in a list on a second display screen of the display.

* * * * *